United States Patent [19]
Bestel

[11] Patent Number: 5,917,167
[45] Date of Patent: Jun. 29, 1999

[54] ENCAPSULATED VACUUM INTERRUPTER AND METHOD OF MAKING SAME

[75] Inventor: E. Fred Bestel, Milwaukee, Wis.

[73] Assignee: Cooper Industries, Inc., Houston, Tex.

[21] Appl. No.: 08/962,686

[22] Filed: Nov. 3, 1997

Related U.S. Application Data

[63] Continuation of application No. PCT/US97/15936, Sep. 10, 1997
[60] Provisional application No. 60/026,057, Sep. 13, 1996.

[51] Int. Cl.⁶ .................................................. H01H 33/66
[52] U.S. Cl. ........................... 218/138; 218/139; 218/155
[58] Field of Search .............................. 218/118, 12, 134, 218/155, 136–139; 29/622

[56] References Cited

U.S. PATENT DOCUMENTS

| | | | |
|---|---|---|---|
| 3,812,314 | 5/1974 | Nonken | 200/144 B |
| 3,955,167 | 5/1976 | Kumbera | 337/188 |
| 4,124,790 | 11/1978 | Kumbera et al. | 200/144 B |
| 4,839,481 | 6/1989 | Nash et al. | 200/144 B |
| 4,871,888 | 10/1989 | Bestel | 200/144 B |
| 4,982,059 | 1/1991 | Bestel | 200/144 B |
| 5,387,772 | 2/1995 | Bestel | 200/144 B |
| 5,452,172 | 9/1995 | Lane et al. | 361/71 |
| 5,597,992 | 1/1997 | Walker | 218/121 |
| 5,698,831 | 12/1997 | Abdelgawad et al. | 218/138 |

FOREIGN PATENT DOCUMENTS

WO 95/27298  10/1995  WIPO ............................ H01H 33/66

*Primary Examiner*—Michael A. Friedhofer
*Attorney, Agent, or Firm*—Fish & Richardson PC

[57] ABSTRACT

An interrupter includes a vacuum assembly, switching contacts enclosed within the vacuum assembly, a layer of compliant material around the vacuum assembly, and a layer of rigid encapsulation surrounding the vacuum assembly and layer. The vacuum assembly may be made from ceramic, the compliant material may be silicone, and the rigid encapsulation may be epoxy. The compliant material may also be a sleeve that is expanded so as to receive the vacuum assembly.

28 Claims, 4 Drawing Sheets

VSAM MODULE THERMAL COEFFICIENTS VS TEMPERATURE

ENCAPSULATED VACUUM INTERRUPTER AND METHOD OF MAKING SAME

CROSS-REFERENCE TO RELATED APPLICATIONS

This application claims benefit of U.S. Provisional Application No. 60/026,057, filed on Sep. 13, 1996, which is incorporated in its entirety herein by reference, and a continuation which claims the benefit of International Application No. PCT/US97/15936, which was filed on Sep. 10, 1997, and designated the United States of America.

BACKGROUND OF THE INVENTION

1. Field of the Invention

The present invention relates to an encapsulation for a high voltage interrupter, and more preferably, to a method of casting the interrupter in epoxy.

2. Description of Related Art

Vacuum interrupters are well known in the art for interrupting high voltage lines. See U.S. Pat. Nos. 4,839,481; 4,871,888; 4,982,059; and 5,387,772, the subject matter of which are hereby incorporated herein by reference. The contacts of the interrupters are sealed in a vacuum within a ceramic (such as $Al_2O_3$) cylinder or bottle.

A prior art switch vacuum bottle is cast within the upper end of an epoxy structure or encapsulation that includes an internal cavity for the operating rod. The mechanical and dielectric properties of the encapsulation were enhanced by molding the $Al_2O_3$ bottle in a layer of polyurethane. The polyurethane encased bottle was then cast in an epoxy encapsulation. A problem with the prior art occurs because of the difference between the coefficient of thermal expansion of the epoxy, the coefficient of thermal expansion of the $Al_2O_3$ ceramic housing, and the upper thermal limit of the polyurethane.

In particular, the epoxy is typically cured at high temperatures, such as 140° C. As evidenced in FIG. 1, when the epoxy cools, the coefficient of thermal expansion of the epoxy changes dramatically. The changes in the coefficient of thermal expansion of the epoxy cause the epoxy to come under significant tension and stress when cooled because the ceramic housing and the polyurethane coating have much different coefficients of thermal expansion. As a result, cracks or potential weak points may be created in the epoxy or polyurethane casting, thus compromising the necessary dielectric qualities of the entire module.

Before the present invention, to overcome the potential external dielectric weakness of the ceramic bottle, the interrupter was submerged in a tank of oil or gas to ensure that the interrupter was adequately insulated. This was heavy and expensive.

An additional problem with the prior art is the high cost of the polyurethane coating.

OBJECTS AND SUMMARY

An object of the present invention is to provide an efficient method of encasing the ceramic vacuum bottles in an epoxy encapsulation without creating unnecessary stress in the epoxy casting.

Another object is to find an economical and environmentally safe manner of casting a ceramic vacuum bottle in an epoxy encapsulation.

According to the present invention, the interrupter is encased within a vacuum assembly, a layer of compliant material is placed around the vacuum assembly, and a layer of rigid epoxy encapsulation is formed around the vacuum assembly and layer. The vacuum assembly may be made from ceramic, the compliant material may be silicone rubber, and the rigid encapsulation may be epoxy. The compliant material may also be a sleeve that is expanded so as to receive the vacuum assembly.

DETAILED DESCRIPTION OF THE PREFERRED EMBODIMENTS

Figure 1:
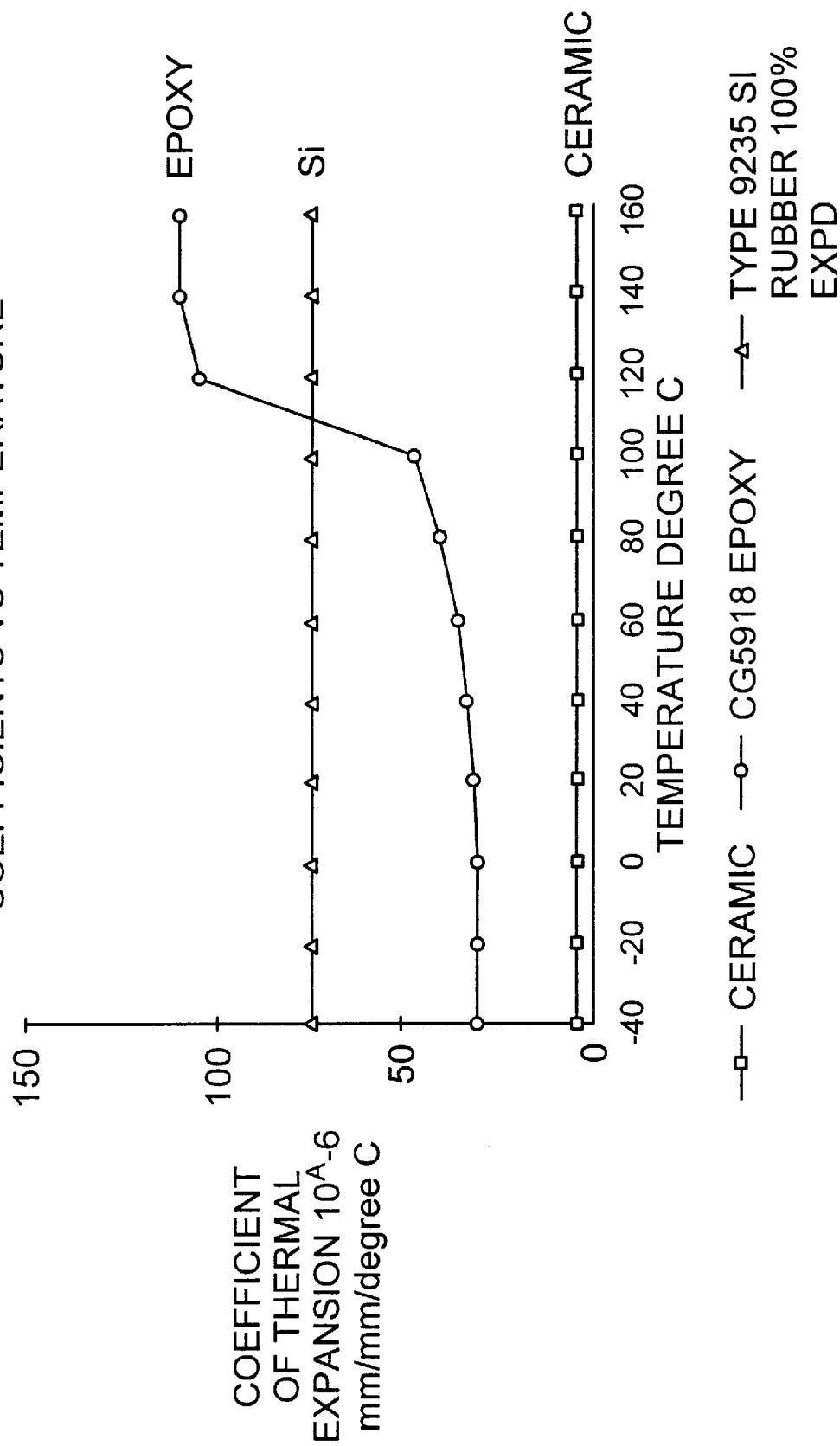
FIG. 1 is a chart showing the relationship of the coefficients of thermal expansion versus temperature for silicone, epoxy, and ceramic.

According to the present invention, a novel method of encapsulating a high voltage interrupter, such as one enclosed in a vacuum bottle, is taught. In particular, according to the present invention, a stretched silicone sleeve is placed over the vacuum bottle prior to casting the vacuum bottle in an epoxy encapsulation. Although there are several ways in which the silicone sleeve may be stretched over the bottle, one of the preferred embodiments involves the use of a vacuum manifold 10. See FIGS. 2–5.

The vacuum manifold 10 has a preferably substantially cylindrical opening 12 that is large enough to accommodate a vacuum bottle 18. Although the opening 12 is described as substantially cylindrical, it is actually preferably somewhat concave in shape so that a central portion 20 of the opening 12 has a diameter that is narrower than a diameter at the outer ends of the opening 12. The significance of the slight concavity will be explained herein below.

A plurality of apertures 14 encircle the opening 12 in order to draw a vacuum within the opening 12. Although not illustrated in the Figures, the apertures 14 are connected to a device for creating the vacuum within the opening 12.

Figure 2:
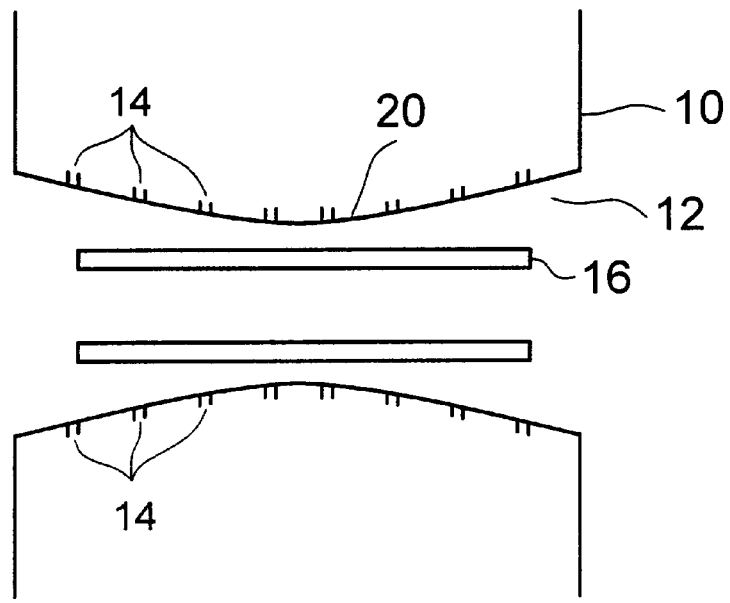
FIG. 2 illustrates a silicone sleeve inserted into a vacuum manifold.

A length of tubing of silicone 16 is cut so as to be at least as long as the length of the vacuum manifold 10. In a preferred embodiment, the vacuum bottle is about 19.1 cm. long and 5.08 cm. in diameter. The sleeve preferably extends beyond the length of the bottle by approximately 5.0 cm. at both ends of the bottle. The sleeve has a wall thickness of 0.33 cm. in a relaxed condition. The sleeve 16 is placed within the opening 12 of the vacuum manifold 10. FIG. 2 illustrates the sleeve 16 in a relaxed position within the vacuum manifold 10.

Figure 3:
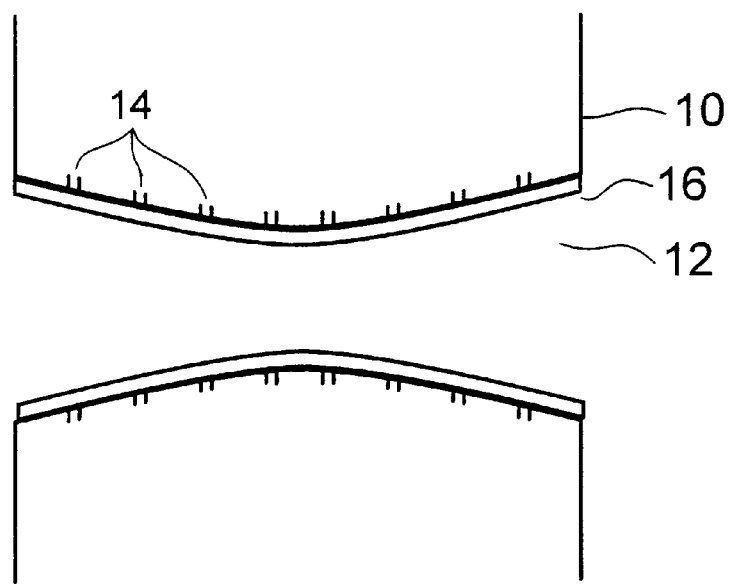
FIG. 3 illustrates the silicone sleeve being held against the openings in the vacuum manifold by a vacuum.

Using the vacuum manifold 10, the sleeve is expanded to approximately two and a half times its original inner diameter. The expansion of the sleeve may be facilitated by inserting a bladder into the sleeve and inflating the bladder by blowing into it. Once the sleeve makes contact with the surface of the opening 12, the suction applied through the apertures 14 will hold the sleeve 16 in its expanded state. The bladder may then be removed. FIG. 3 illustrates the sleeve 16 expanded to two and a half times its original ID and held against the wall of the opening 12 of the vacuum manifold 10 by a suction applied through the apertures 14.

Figure 4:
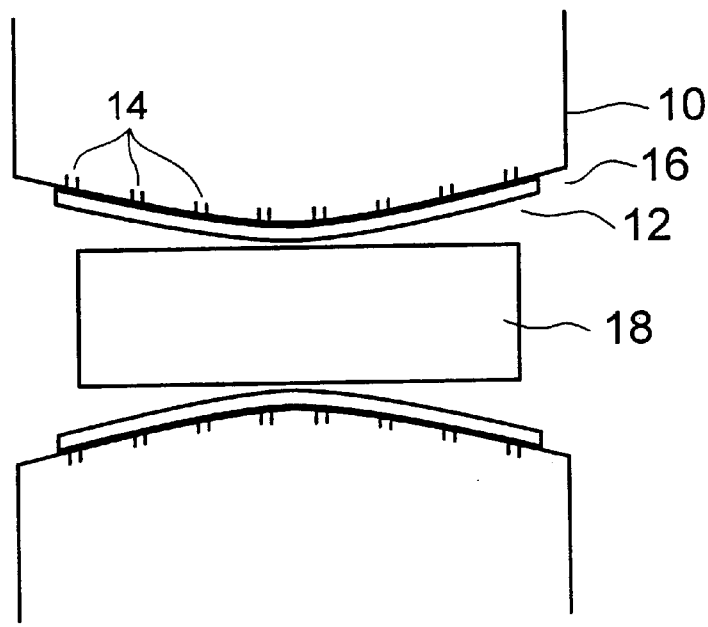
FIG. 4 illustrates a vacuum bottle inserted in the silicone sleeve that is held against the openings in the vacuum manifold.
Figure 5:
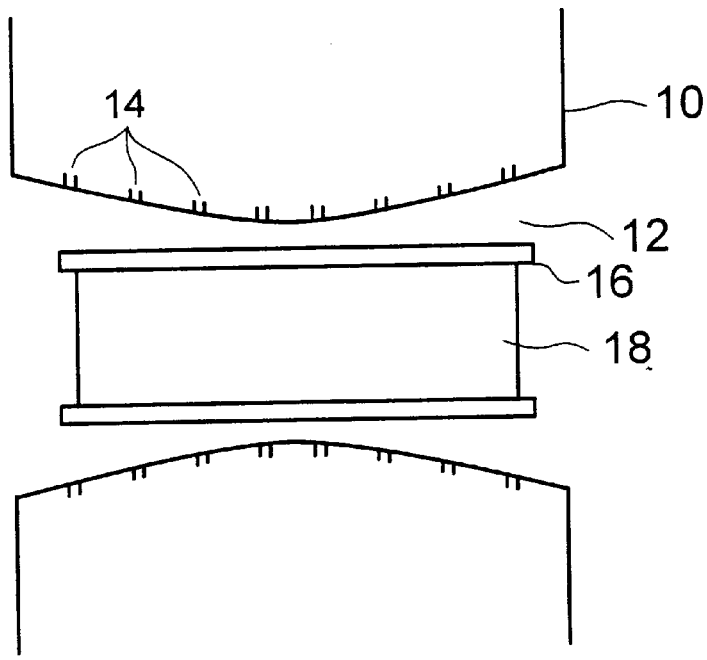
FIG. 5 illustrates the silicone sleeve secured on the vacuum bottle within the vacuum manifold.
Figure 6:
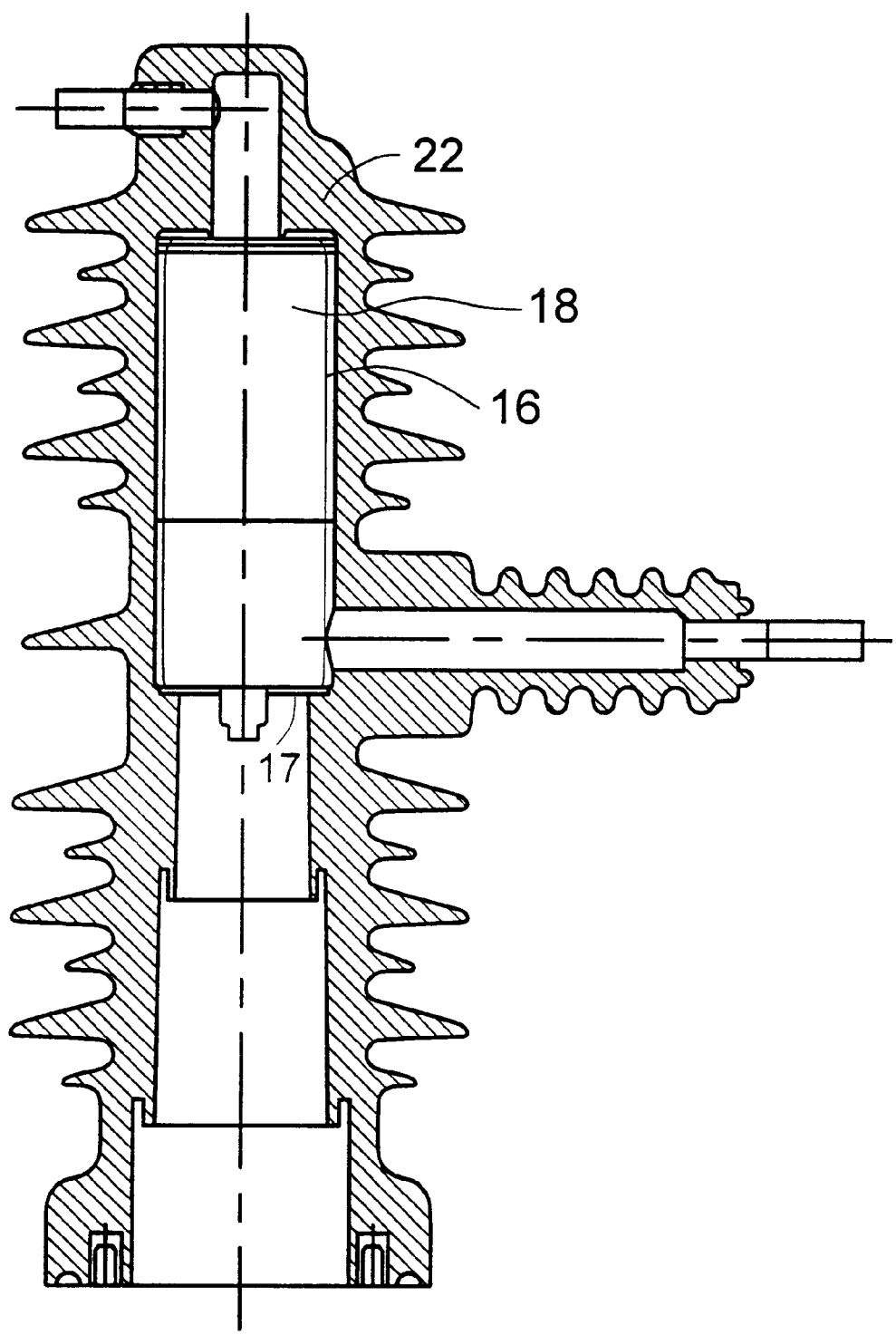
FIG. 6 illustrates the vacuum bottle and silicone sleeve cast in an epoxy encapsulation.

As seen in FIG. 4, a vacuum bottle 18 is then inserted within the expanded sleeve 16. The suction is then discontinued from the apertures 14 so as to cause the sleeve 16 to release from the interior wall of the vacuum manifold 10 and to collapse about the vacuum bottle 18. See FIG. 5. The vacuum manifold 10 is somewhat concave, having its narrowest diameter at the center. An advantage of that construction is that when the suction is discontinued from the apertures 14, the sleeve 16 is closest to the bottle 18 at the center point of the bottle, and will contact the bottle initially at the center point and continue to collapse onto the bottle in an outward pattern. As a result, air between the sleeve 16 and the bottle 18 will be pushed out and will not be trapped between the sleeve 16 and the bottle 18.

In a preferred embodiment, when the sleeve 16 is in its collapsed position around the vacuum bottle 18, the sleeve 16 is expanded to about twice its original inner diameter and now has a wall thickness of approximately 0.23 cm. In view of the expanded state of the silicone sleeve, the pressure of the sleeve 16 against the bottle 18 further acts to squeeze air out from between the sleeve 16 and the bottle 18.

Prior to inserting the vacuum bottle 18 into the expanded sleeve 16, a silane based adhesive is preferably coated on the ceramic bottle (or on the inside of the silicone sleeve 16) to enable the sleeve to actually bond to the vacuum bottle 18. In one embodiment, SILQUEST A-1100 silane (gamma-aminopropyl triethoxysilane) is used. The silane may be diluted with isopropyl alcohol. The stretching or expanding of the silicone sleeve during installation expands the molecular chain which facilitates cross-linking of the molecules.

After the vacuum bottle 18 with the silicone sleeve 16 secured thereon is removed from the vacuum manifold 10, it is preheated to about 160° C. The preheated vacuum bottle 18 and the expanded silicone sleeve 16 is then placed in a mold cavity and an epoxy encapsulation 22 is molded about the vacuum bottle 18 and sleeve 16 at about 160° C. In a preferred embodiment, the epoxy encapsulation 22 is cast from cycloaliphatic prefilled hot-curing two-component epoxy resin.

After the sleeve is placed on the silane coated bottle, the bottle and sleeve are allowed to rest for about 24 hours before the epoxy encapsulation is cast around the bottle and sleeve. This period enables the silane to diffuse through the sleeve, and facilitates a bonding of the sleeve to the epoxy encapsulation which is placed over the bottle and sleeve arrangement.

The cycloaliphatic epoxy is considered to be an outdoor grade epoxy because of its durability and ability to withstand ultraviolet radiation. Although other types of epoxy, such as bisphenol, may be more compliant, and thus more suitable to the casting process, bisphenol is not considered to be an outdoor grade epoxy.

The epoxy material has a coefficient of thermal expansion within the range of 25 to $50 \times 10^{-6}$ mm/mm/degrees C. in the temperature range of $-40°$ C. to about $+100°$ C., and a coefficient of thermal expansion of about $100 \times 10^{-6}$ mm/mm/degrees C. within the temperature range of $+100°$ C. to about $+160°$ C.

During the casting process, the epoxy encapsulation is formed at about 160° C. In the preferred embodiment, the epoxy flows in liquid form to form and bond to the silicone sleeve 16 and fill in the remainder of the mold cavity. At this elevated temperature, the epoxy has a relatively high coefficient of thermal expansion of about $100 \times 10^{-6}$ mm/mm/degrees C. As the epoxy cools through the glass transition range, the coefficient of thermal expansion drops to about 25 to $50 \times 10^{-6}$ mm/mm/degrees C.

Accordingly, the silicone sleeve 16 that is in tension from being expanded so as to fit around the bottle 18 becomes under compression from the epoxy after the epoxy encapsulation shrinks upon cooling. In the preferred embodiment, upon cooling, the epoxy wall is 1.0 cm. thick, 10.0 cm. in diameter (outside diameter), and the silicone is compressed to a thickness of 0.15 cm. Compression of the silicone is limited as the bottom surface of the silicone sleeve 16 is free to expand into cavity 17 when the compression exceeds a predetermined threshold.

The silicone sleeve 16 has a Durometer reading in the range of 30–35 when it is in the nonexpanded state, and it has a Durometer reading in the range of 55–57 when it is in its expanded state on the ceramic bottle.

The expanded silicone has a coefficient of thermal expansion within the range of 60 to $90 \times 10^{-6}$ mm/mm/degrees C., and more preferably within the range of 70 to $80 \times 10^{-6}$ mm/mm/degrees C. This coefficient of thermal expansion is relatively constant over the temperature range of $-40°$ C. to $+160°$ C.

Thus, the coefficient of thermal expansion of the epoxy changes from being higher than that of the expanded silicone sleeve when the epoxy is first cast, to a level that is below that of the expanded silicone sleeve after the epoxy cools. In the state wherein the epoxy is below the glass transition temperature, the coefficient of thermal expansion of the expanded sleeve 16 is at a value of about one half of the coefficient of the epoxy.

The alumina ceramic material has a coefficient of thermal expansion within the range of 2 to $20 \times 10^{-6}$ mm/mm/degrees C., and more preferably within the range of 5 to $15 \times 10^{-6}$ mm/mm/degrees C. This coefficient of thermal expansion is relatively constant over the temperature range of $-40°$ C. to $+160°$ C.

Furthermore, in view of the interplay between the coefficients of thermal expansion of the various elements, and further in view of the cushioning effect created by the compliant nature of the silicone, the stress in the epoxy encapsulation 22 is reduced. As a result of this reduced stress, the dielectric and mechanical properties of the epoxy encapsulation 22 are greatly improved. The costly and difficult usage of polyurethane in the prior art can thus be avoided.

Another advantage of using the silicone sleeve with the epoxy is that the silicone sleeve and the epoxy encapsulation have similar dielectric values, creating a homogenous dielectric encapsulation. The silicone has a dielectric value of about 3, and the epoxy has a dielectric value of about 4. Because air has a lower dielectric value, all air should be kept out of the finished encapsulation.

A significant benefit is that it is no longer necessary to keep the vacuum bottle immersed within a tank of oil or gas, thus overcoming a number of disadvantages of other prior art.

In the preferred embodiment, the interrupter is an axial magnetic field interrupter, such as the type disclosed in U.S. Pat. No. 4,871,888, the subject matter of which is hereby incorporated herein by reference.

Although, the preferred embodiment disclosed above defines specific materials and levels of expansion, the present invention is not specifically limited to the details set forth above. Materials other than silicone may be used for the sleeve 16, provided that such materials provide the necessary properties, including flexibility and thermal expansion. In addition, the method of encapsulating the vacuum bottle may have application in other industries and environments, in addition to the high voltage interrupter art. Accordingly, the present invention is not limited to the specific claims appended hereto, but shall be deemed to include equivalents as well.

What is claimed is:

1. An interrupter, comprising:
   a vacuum assembly;
   switching contacts enclosed within the vacuum assembly;
   a layer of expanded compliant material around the vacuum assembly; and
   a layer of rigid material surrounding the vacuum assembly and the layer of expanded compliant material.

2. The interrupter of claim 1, wherein the compliant material is expanded silicone.

3. The interrupter of claim 2, wherein the rigid material is an encapsulation of epoxy.

4. The interrupter of claim 3, wherein the vacuum assembly includes a ceramic bottle.

5. The interrupter of claim 4, wherein the silicone is bonded to the ceramic bottle with a silane based adhesive.

6. The interrupter of claim 2, wherein the rigid material is an encapsulation of cycloaliphatic epoxy.

7. The interrupter of claim 1, wherein the compliant material is expanded to twice an original diameter.

8. The interrupter of claim 1, wherein a coefficient of thermal expansion of the compliant material is within a range of $60–90 \times 10^{-6}$ mm/mm/degrees C., and the rigid material has a coefficient of thermal expansion within a range of 25 to $50 \times 10^{-6}$ mm/mm/degrees C. in a temperature range of $-40°$ C. to about $+100°$ C. and a coefficient of thermal expansion of about $100 \times 10^{-6}$ mm/mm/degrees C. within a temperature range of $+100°$ C. to about $+160°$ C.

9. The interrupter of claim 8, wherein the rigid material is formed at about $160°$ C. and upon cooling maintains the compliant material in a compressed condition.

10. The interrupter of claim 9, wherein the vacuum assembly is about 5.08 cm. in diameter, the expanded compliant material is about 0.23 cm. thick, and the rigid material is about 1.0 cm. thick.

11. The interrupter of claim 10, wherein the vacuum assembly and the rigid material define an opening through which the compliant material can flow when the compliant material reaches a threshold compression level.

12. The interrupter of claim 1, wherein a coefficient of thermal expansion of the compliant material is within a range of $60–90 \times 10^{-6}$ mm/mm/degrees C. and a coefficient of thermal expansion of the rigid material is at a level higher than the coefficient of thermal expansion of the compliant material when the rigid material is first cast around the compliant material and the coefficient of thermal expansion of the rigid material changes to a level lower than the coefficient of thermal expansion of the compliant material after the rigid material has cooled.

13. The interrupter of claim 12, wherein the compliant material is expanded silicone and the rigid material is epoxy.

14. The interrupter of claim 1, wherein the compliant material has a Durometer reading in a range of 55 to 57.

15. An interrupter, comprising:
    a vacuum assembly enclosing an axial magnetic field interrupter;
    a layer of outdoor grade epoxy surrounding the vacuum assembly; and
    a layer of compliant material between the vacuum assembly and the layer of epoxy, wherein the layer of compliant material is expanded silicone.

16. The interrupter of claim 15, wherein the epoxy is cycloaliphatic epoxy.

17. The interrupter of claim 15, wherein the compliant material has a Durometer reading in a range of 55 to 57.

18. A method of encapsulating an interrupter, comprising the steps of:
    expanding a sleeve of compliant material;
    inserting the interrupter within the expanded sleeve;
    collapsing the expanded sleeve onto the interrupter; and
    encapsulating the interrupter and sleeve within a rigid material.

19. The method of claim 18, wherein the compliant material is silicone.

20. The method of claim 19, wherein the rigid material is epoxy.

21. The method of claim 19, wherein the sleeve is bonded to the interrupter with a silane based adhesive.

22. The method of claim 21, wherein the silane based adhesive diffuses through the compliant material and bonds the compliant material to the rigid material.

23. The method of claim 18, wherein the sleeve is expanded to at least twice an original diameter.

24. A method of encapsulating an interrupter, comprising the steps of:
    applying a layer of compliant material to the interrupter;
    heating the interrupter and the layer of compliant material; and
    encapsulating the interrupter and the layer of compliant material within a rigid material.

25. The method of claim 24, wherein the applying step includes:
    expanding a sleeve of the compliant material;
    inserting the interrupter within the expanded sleeve;
    collapsing the expanded sleeve onto the interrupter.

26. The method of claim 24, wherein the rigid material is formed at about $160°$ C. and upon cooling maintains the compliant material in a compressed condition.

27. The method of claim 24, wherein the interrupter is about 5 cm. in diameter, the compliant material is about 0.23 cm. thick, and the rigid material is 1.0 cm. thick.

28. The method of claim 24, wherein the rigid material has a coefficient of thermal expansion within a range of 25 to $50 \times 10^{-6}$ mm/mm/degrees C. in a temperature range of $-40°$ C. to about $+100°$ C., and a coefficient of thermal expansion of about $100 \times 10^{-6}$ mm/mm/degrees C. within a temperature range of $+100°$ C. to about $+160°$ C.

* * * * *